United States Patent [19]

Chuan

[11] Patent Number: 4,831,692
[45] Date of Patent: May 23, 1989

[54] HOOK FOR RELEASABLY ATTACHING TO AT LEAST ONE END

[76] Inventor: Jou H. Chuan, No. 11, Lane 436, Sec. 1 Chung San Road, Changhua City, Taiwan

[21] Appl. No.: 58,756

[22] Filed: Jun. 5, 1987

[51] Int. Cl.⁴ .............................................. A44B 15/00
[52] U.S. Cl. ...................................... 24/300; 24/129 R; 24/129 B; 24/230.5 R
[58] Field of Search ................................ 24/300–302, 24/298, 370, 129 R, 129 B, 129 A, 230.5 R, 230.5 TP, 344, 364, 230.5 AD

[56] References Cited

U.S. PATENT DOCUMENTS

| | | | |
|---|---|---|---|
| 201,177 | 3/1878 | Griswold | 24/230.5 R X |
| 979,588 | 12/1910 | Stewart | 24/129 R |
| 1,333,101 | 3/1920 | Cooper | 24/129 R X |
| 1,366,212 | 1/1921 | Pollard | 24/129 B |
| 1,463,456 | 7/1923 | Bear | 24/129 R |
| 1,806,162 | 5/1931 | Hahn | 24/129 B |
| 3,172,178 | 3/1965 | Copell | 24/298 X |
| 3,186,704 | 6/1965 | McCloskey et al. | 24/300 X |
| 3,328,064 | 6/1967 | Simon | 24/298 X |
| 3,678,543 | 7/1972 | Hobbs | 24/230.5 R X |
| 4,034,443 | 7/1977 | Turner | 24/129 R |
| 4,280,435 | 7/1981 | Loomis | 24/129 B X |
| 4,507,987 | 4/1985 | von Berger | 24/230.5 AD X |

Primary Examiner—Kenneth J. Dorner
Assistant Examiner—Laurie K. Cranmer
Attorney, Agent, or Firm—Browdy & Neimark

[57] ABSTRACT

Hook adapted to be easily, quickly and securely attachable on both ends of an elastic cord which is used to tie objects up is disclosed; the present hook is structured to have two symmetric round ends, i.e., the right cord-fixing end and the left hook end, with a relatively large through-hole placed on the latter and three smaller through-holes disposed on the former with one of which being cut open for ready disposition of part of the elastic cord in knotting operation, and there is also provided with a hook member projectingly extended from the left end with the concave thereof facing to the right. An elastic cord can be easily attached to the right end of the present hook by first leading one end of an elastic cord downward through one of the non-opened holes thereof, forming a loop under the right end with the cord itself going therethrough, then guiding this end reversely upward through the other non-opened hole from its bottom with the frontmost end of the cord extended long enough so that when pulling the other end of the cord can make a tight knot naturally for readily securing the present hook to the elastic cord.

1 Claim, 1 Drawing Sheet

U.S. Patent
May 23, 1989
4,831,692
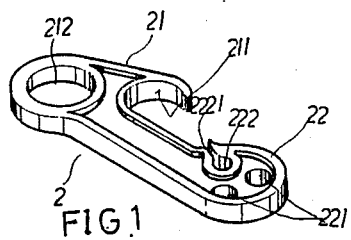
FIG.1
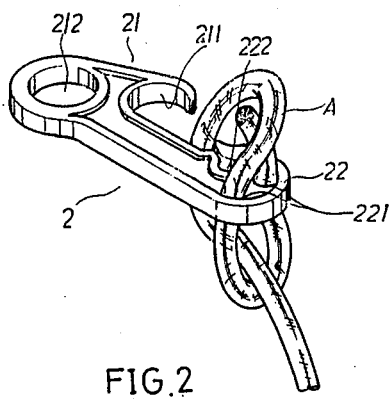
FIG.2
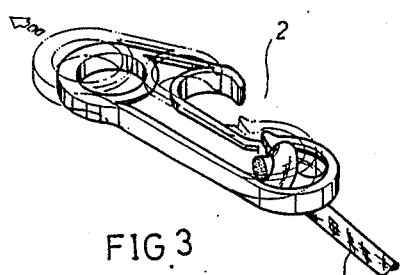
FIG.3
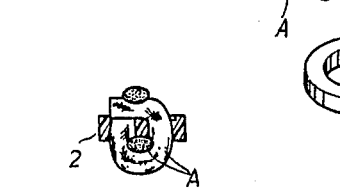
FIG.4
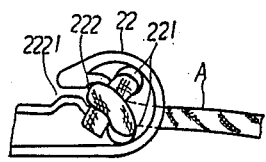
FIG.5
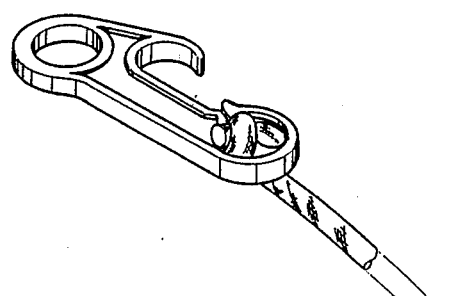
FIG.7
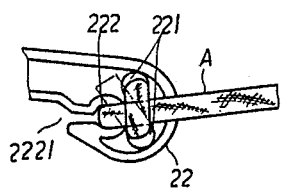
FIG.6
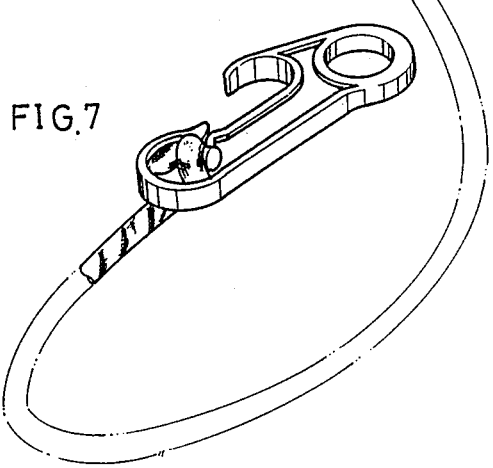

HOOK FOR RELEASABLY ATTACHING TO AT LEAST ONE END

SUMMARY OF THE INVENTION

The present invention is related to a hook which is releasably attached to both the ends of an elastic cord used for tying objects up with ease. The present hook is characterized in that the body thereof is formed by integral injection molding, and includes a left hook end and a right cord-fixing end, the latter is designed to have three through holes with one of which having a cut disposed on the periphery thereof, and these three holes are located respectively at three symmetric points so to effect quick and ready fixing of one end of an elastic cord in a secure and properly knotted manner to the present hook.

There have been many similarly functional hooks available on the market, which generally are made of two kinds of material, i.e., metal and plastics, and come into shape by way of mechanical processing and injection molding respectively.

The mechanical progressing further consists of steel plate stamping and steel wire winding methods. The shapes of the products are either in flat form or in helicoid form; the former method is relatively complicated and tedious, resulting in low efficiency and waste of labor; moreover, the burred edges from the machining can be harmful to the hands or the like of a user and also to the elastic cord, reducing the operation durability of the same. Moreover, the surface of the stamped products has to be further finished; and the conventional hook has to be coupled to the elastic cord by buckle means or by knots, thus the user may feel inconvenient in such operations.

Although the other approach, i.e., plastic injection molding can eliminate most of the above disadvantages effectively, however, the so-produced hook means is still short of perfection due to dissatisfactory design, causing the hook easily to detach from the elastic cord in use, and the attachment of this hook is also not quick enough.

The present inventor viewing those disadvantages associated with conventional related hooks has been motivated to make some improvement on the same so to obtain a novel hook means which is readily releasably attached to both the ends of an elastic cord which is employed to tie objects up.

Therefore, the primary object of the present invention is to provide a simply manufactured and readily operable hook which is releasably attached to both the ends of an elastic cord and produced by way of plastic injection molding, and there are provided with three holes on the right cord-fixing end which are symmetrically located with the leftmost hole having a slot-like cut for effecting easy disposition of a cord portion in knotting operation.

Another object of the present invention is to provide a hook which is releasably attached to both the ends of an elastic cord, and is characterized by that a hook member is extendedly projectig from the left hook end of the present invention with its concave thereof facing to the right, and a large through-hole is placed on the left hook end to facilitate the pulling operation by fingers thereon, thus causing the elastic cord extended so to effect a tight tying purpose with the hook member hooked to a proper location after the tensioned cord is released.

BRIEF DESCRIPTION OF THE DRAWINGS

FIG. 1 is a perspective view of the present hook;

FIG. 2 is a diagram showing the present hook being attached to the end of an elastic cord;

FIG. 3 is another diagram showing the present hook having been attached to the end of an elastic cord;

FIG. 4 is a lateral sectional view of the present hook;

FIG. 5 is a top view of the right cord fixing end of the present hook, with the end of an elastic cord being attached thereto;

FIG. 6 is a bottom view of the right cord fixing end of the present hook, with the end of an elastic cord being attached thereto;

FIG. 7 is a diagram showing an elastic cord being attached with two present hooks for use in tying objects up.

DETAILED DESCRIPTION

Refer first to FIG. 1, the present hook adapted to be releasably attached to both the ends of an elastic cord is integrally formed by plastic injection molding, and all the corners thereof are properly rounded so to avoid the hands of users and the elastic cord itself being cut by the cutting edges thereof.

The body of the present hook consists of a left hook end having a hook member 21 and a right cord-fixing end 22 to which one end of an elastic cord A can be readily and quickly secured. Said left hook end is provided with a relatively large through hole 212 for the facility of pulling of the left hook end in tying operation and a hook member 21 having a concavity 211 facing to the right is integrally fixed to said left hook end.

Said right cord-fixing end 22 is provided with three-through holes 221 and 222 with the latter having an open slot 2221 disposed on the periphery thereof for the facility of the dispositon of said elastic cord in a knotting operation, and said three holes are located in a symmetric manner with said slot 2221 facing to the concavity 211 of said hook member 21.

When the present hook 2 is intended to secure to one end of an elastic cord A, the following steps are accordingly carried out: the end of said elastic cord is first led downward through one of the said holes 221 and then reversely guided upward through the other, forming a knot loop under said cord-fixing end with the cord itself going therethrough, and the frontmost end of the cord A being extended through a knot loop forming above said cord fixing end as shown in FIG. 2, so that the pulling of the other end of said cord A makes the so-arranged end turn into a tight knot readily, resulting in a secure and firm coupling of the present hook to an elastic core A which is employed to tie objects up, as shown in FIG. 3.

As a result of the symmetric, triangular arrangement of said holes 221 and 222, as well as the elasticity of said elastic cord A, the right cord-fixing end 22 of the present hook 2 can be firmly and securely coupled to said elastic cord A by way of the interlockingly wound cord itself; and the larger the pulling force is, the tighter the knot becomes, as shown in FIG. 5 and FIG. 6.

Furthermore, said large hole 212 placed at the left hook end is for the facility of pulling operation by a finger in tying process as shown in FIG. 3, and said hook member 21 has a concavity 211 facing to the right, in such a manner that said hook member 21 can be hooked firmly to any particular point or place due to the tension of said elastic cord when the same is released from its extended state as shown in FIG. 3.

What I claim is:

1. A hook means for releasably attaching to at least one end of an elastic cord, said hook means comprising two symmetric round ends, a left hook end and a right cord-fixing end, wherein said right cord-fixing end is provided with first, second and third through-holes which are symmetrically located at three points in a triangular arrangement, said first through-hole being closest to said left hook end and having an open cut on the periphery thereof, and said left hook end being provided with a means, defining a large through-hole, for receiving a finger at the center thereof, and a hook member projectingly extended therefrom with the concave surface thereof facing toward to the open cut, wherein a line connecting the open cut and extending through a space between the second and third through-holes also extends through said concave surface of said hook member.

* * * * *